(12) United States Patent
Rawlinson

(10) Patent No.: US 8,393,427 B2
(45) Date of Patent: Mar. 12, 2013

(54) VEHICLE BATTERY PACK BALLISTIC SHIELD

(75) Inventor: Peter Dore Rawlinson, Playa Del Rey, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/572,904

(22) Filed: Aug. 13, 2012

(65) Prior Publication Data

US 2012/0312615 A1 Dec. 13, 2012

Related U.S. Application Data

(60) Division of application No. 13/311,435, filed on Dec. 5, 2011, now Pat. No. 8,286,743, which is a continuation of application No. 13/311,343, filed on Dec. 5, 2011.

(60) Provisional application No. 61/426,254, filed on Dec. 22, 2010.

(51) Int. Cl.
*B60R 16/04* (2006.01)

(52) U.S. Cl. ...................................... 180/68.5

(58) Field of Classification Search ............... 180/68.5; 429/96, 400; 105/51; 224/400; 248/500
See application file for complete search history.

(56) References Cited

U.S. PATENT DOCUMENTS

| | | |
|---|---|---|
| 4,174,014 A | 11/1979 | Bjorksten |
| 4,336,644 A | 6/1982 | Medlin |
| 4,352,316 A | 10/1982 | Medlin |
| 5,086,860 A | 2/1992 | Francis et al. |
| 5,305,513 A | 4/1994 | Lucid et al. |
| 5,378,555 A * | 1/1995 | Waters et al. ............ 429/97 |
| 5,534,364 A | 7/1996 | Watanabe et al. |
| 5,620,057 A | 4/1997 | Klemen et al. |
| 5,639,571 A | 6/1997 | Waters et al. |
| 5,681,668 A | 10/1997 | Reed et al. |
| 6,094,927 A | 8/2000 | Anazawa et al. |
| 6,224,998 B1 | 5/2001 | Brouns et al. |
| 6,227,322 B1 | 5/2001 | Nishikawa |
| 6,547,020 B2 | 4/2003 | Maus et al. |
| 6,632,560 B1 | 10/2003 | Zhou et al. |
| 6,662,891 B2 | 12/2003 | Misu et al. |
| 7,427,093 B2 | 9/2008 | Watanabe et al. |
| 7,654,352 B2 | 2/2010 | Takasaki et al. |
| 7,717,207 B2 | 5/2010 | Watanabe et al. |
| 7,770,525 B2 | 8/2010 | Kumar et al. |
| 8,037,096 B2 | 10/2011 | Kiya |
| 8,091,669 B2 | 1/2012 | Taneda et al. |
| 2001/0030069 A1 | 10/2001 | Misu et al. |
| 2002/0162696 A1 | 11/2002 | Maus et al. |
| 2004/0016580 A1 | 1/2004 | Kronner et al. |
| 2006/0005695 A1 | 1/2006 | Honlinger et al. |
| 2009/0021052 A1 | 1/2009 | Kato |
| 2009/0186266 A1 | 7/2009 | Nishino et al. |
| 2009/0242299 A1 | 10/2009 | Takasaki et al. |
| 2010/0025132 A1 | 2/2010 | Hill et al. |
| 2010/0175940 A1 | 7/2010 | Taneda et al. |
| 2010/0273040 A1 | 10/2010 | Kubota et al. |

(Continued)

FOREIGN PATENT DOCUMENTS

WO  WO 2012063393  5/2012

*Primary Examiner* — Hau Phan
*Assistant Examiner* — Jacob Meyer
(74) *Attorney, Agent, or Firm* — Patent Law Office of David G. Beck

(57) ABSTRACT

An improved protection system for a battery pack mounted between the passenger cabin floor panel of an electric vehicle and the driving surface is provided, the system utilizing a ballistic shield mounted under the electric vehicle and interposed between the battery pack enclosure and the driving surface, where the ballistic shield is spaced apart from the enclosure bottom panel. A layer of a compressible material is interposed between the ballistic shield and the battery pack enclosure.

19 Claims, 14 Drawing Sheets

U.S. PATENT DOCUMENTS

| | | |
|---|---|---|
| 2010/0289295 A1 | 11/2010 | Yoda et al. |
| 2010/0307848 A1 | 12/2010 | Hashimoto et al. |
| 2011/0300427 A1 | 12/2011 | Iwasa et al. |
| 2012/0021301 A1 | 1/2012 | Ohashi |
| 2012/0028135 A1 | 2/2012 | Ohashi |
| 2012/0073888 A1 | 3/2012 | Taneda et al. |
| 2012/0103714 A1 | 5/2012 | Choi et al. |
| 2012/0156539 A1 | 6/2012 | Honjo et al. |
| 2012/0161429 A1 | 6/2012 | Rawlinson et al. |
| 2012/0161472 A1 | 6/2012 | Rawlinson et al. |
| 2012/0223113 A1* | 9/2012 | Gaisne et al. .......... 224/538 |
| 2012/0312597 A1* | 12/2012 | Toyama et al. .......... 174/84 C |

* cited by examiner

VEHICLE BATTERY PACK BALLISTIC SHIELD

CROSS-REFERENCE TO RELATED APPLICATION

The present application is a divisional of U.S. patent application Ser. No. 13/311,435, filed 5 Dec. 2011, which is a continuation of U.S. patent application Ser. No. 13/311,343, filed 5 Dec. 2011, and claims benefit of the filing date of U.S. Provisional Patent Application Ser. No. 61/426,254, filed Dec. 22, 2010, the disclosures of which are incorporated herein by reference for any and all purposes.

FIELD OF THE INVENTION

The present invention relates generally to vehicle structures and, more particularly, to means for improving the integration of a battery pack into an electric vehicle.

BACKGROUND OF THE INVENTION

A large percentage of the world's vehicles run on gasoline using an internal combustion engine. The use of such vehicles, more specifically the use of vehicles which rely on fossil fuels, e.g., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles, due to their cleaner and more efficient drive systems, offer one of the most promising alternatives to vehicles that use internal combustion drive trains. To be successful, however, an electric vehicle must meet consumers' expectations relative to performance, range, reliability, lifetime and cost. These expectations, in turn, place considerable importance on the design, configuration and implementation of the electric vehicle's rechargeable batteries.

In a typical electric vehicle, either an all-electric or hybrid vehicle, the battery pack is mounted to the vehicle's floor in a location intended to be as unobtrusive as possible. For example, in U.S. Pat. No. 7,427,093, issued 23 Sep. 2008, the battery pack is mounted to the vehicle floor panel, under the front seat. The disclosed system includes a protective member, for example attached to the battery pack itself, which is shaped and positioned to protect the battery pack and the wiring harness from possible damage by passengers in the rear seat.

U.S. Pat. No. 7,717,207, issued 18 May 2010, discloses an alternate battery pack mounting structure that is intended to minimize battery pack damage in the event of a vehicle collision. As disclosed, the battery pack is mounted to the rear portion of the vehicle frame, the frame including a deformable portion that deforms in an up-down direction when an impact load is applied in a longitudinal direction. The battery pack is fixed to the frame in such a way that it will move relative to the deformable portion when the deformable portion deforms under load, thus minimizing the transfer of load energy to the battery pack and allowing the shape of the pack to be maintained during a collision.

U.S. Pat. No. 8,037,960, issued 18 Oct. 2011, discloses an alternate battery mounting structure designed to minimize battery pack damage in the event of a vehicle collision. As disclosed, the battery pack structure is mounted to the rear side of the rear vehicle seats using bolts/screws that are designed to break and allow the battery pack to detach and move when the vehicle is in a collision.

Although the prior art teaches a variety of techniques for mounting large battery packs within an electric vehicle, what is needed is a battery mounting system that fully integrates the battery pack enclosure into the vehicle in such a way as to take advantage of the pack's rigidity and strength, while still protecting the battery pack from accidental damage and minimizing the effects of the battery pack on vehicle occupant comfort and safety. The present invention provides such a system.

SUMMARY OF THE INVENTION

The present invention provides a system for protecting a battery pack mounted to an electric vehicle, the system utilizing a battery pack enclosure that includes an enclosure top panel, an enclosure bottom panel, and a plurality of enclosure side members, where the battery pack enclosure is configured to hold a plurality of batteries, and where the battery pack is mounted between the passenger cabin floor panel and the driving surface. The system further includes a ballistic shield mounted under the electric vehicle and interposed between the battery pack enclosure and the driving surface, where the ballistic shield is spaced apart from the enclosure bottom panel by at least 5 millimeters; alternately, by at least 10 millimeters; alternately, by at least 15 millimeters; alternately, by at least 25 millimeters; alternately, by at least 35 millimeters; alternately, by at least 50 millimeters. The ballistic shield may be fabricated from aluminum, an aluminum alloy, steel, fiberglass, a carbon fiber/epoxy composite, and/or plastic. A layer of compressible material is interposed between the ballistic shield and the battery pack enclosure, where the compressible material may deform in an elastic manner, or in an inelastic manner, upon compression. The compressible material layer may be fabricated from foam or plastic. The compressible material layer may be shaped, for example with a plurality of projections and a plurality of dips (e.g., egg crate shaped).

The battery pack enclosure may be substantially airtight; may be fabricated from an aluminum, aluminum alloy or steel; may have the enclosure bottom panel welded, brazed, soldered or bonded to the plurality of enclosure side members; may have the enclosure top panel bolted to the plurality of enclosure side members; may be positioned between the front and rear vehicle suspension assemblies and mounted between, and mechanically coupled to, vehicle structural members (e.g., rocker panels) located on either side of the vehicle; and may include a plurality of cross-members that transverse the battery pack enclosure and segregate the batteries into groups of batteries.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within an enclosure, the individual batteries electrically interconnected to achieve the desired voltage and capacity for a particular application. As such, the terms "battery pack" and "battery pack enclosure" may be used interchangeably herein. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
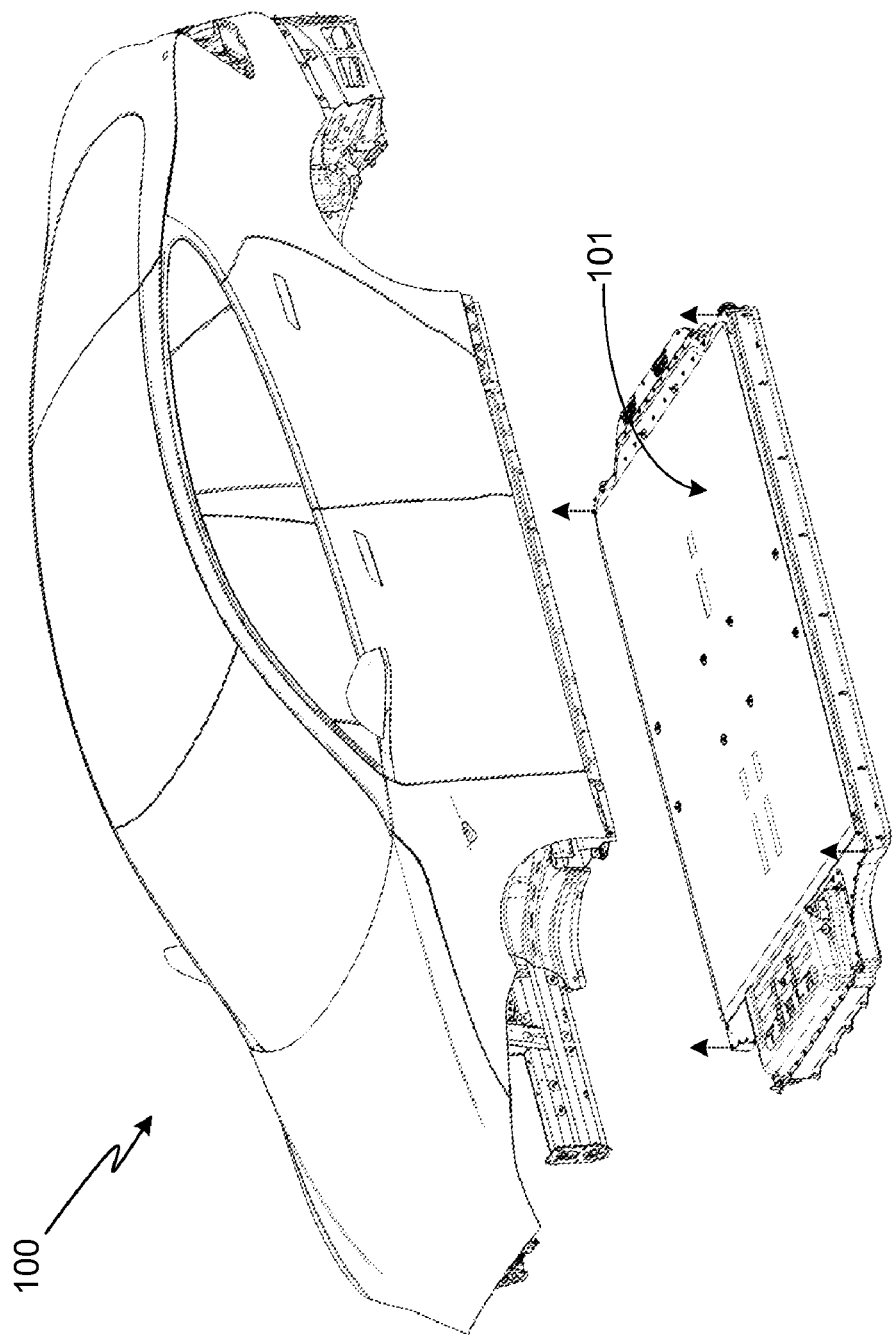
FIG. 1 provides a perspective view of a portion of a vehicle body and frame with the battery pack separated from the structure.
Figure 2:
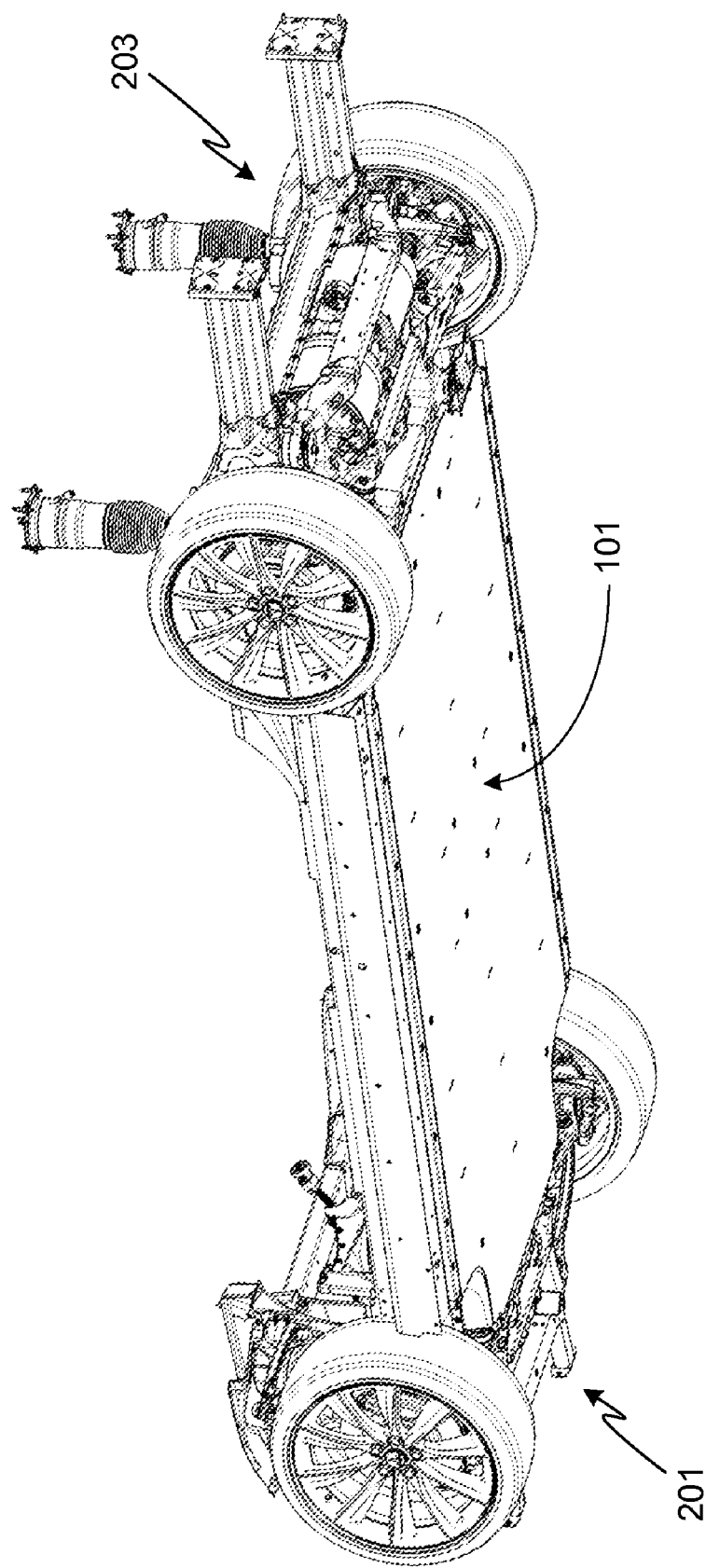
FIG. 2 provides a perspective view of a vehicle's undercarriage with the battery pack incorporated into the vehicle structure.
Figure 3:
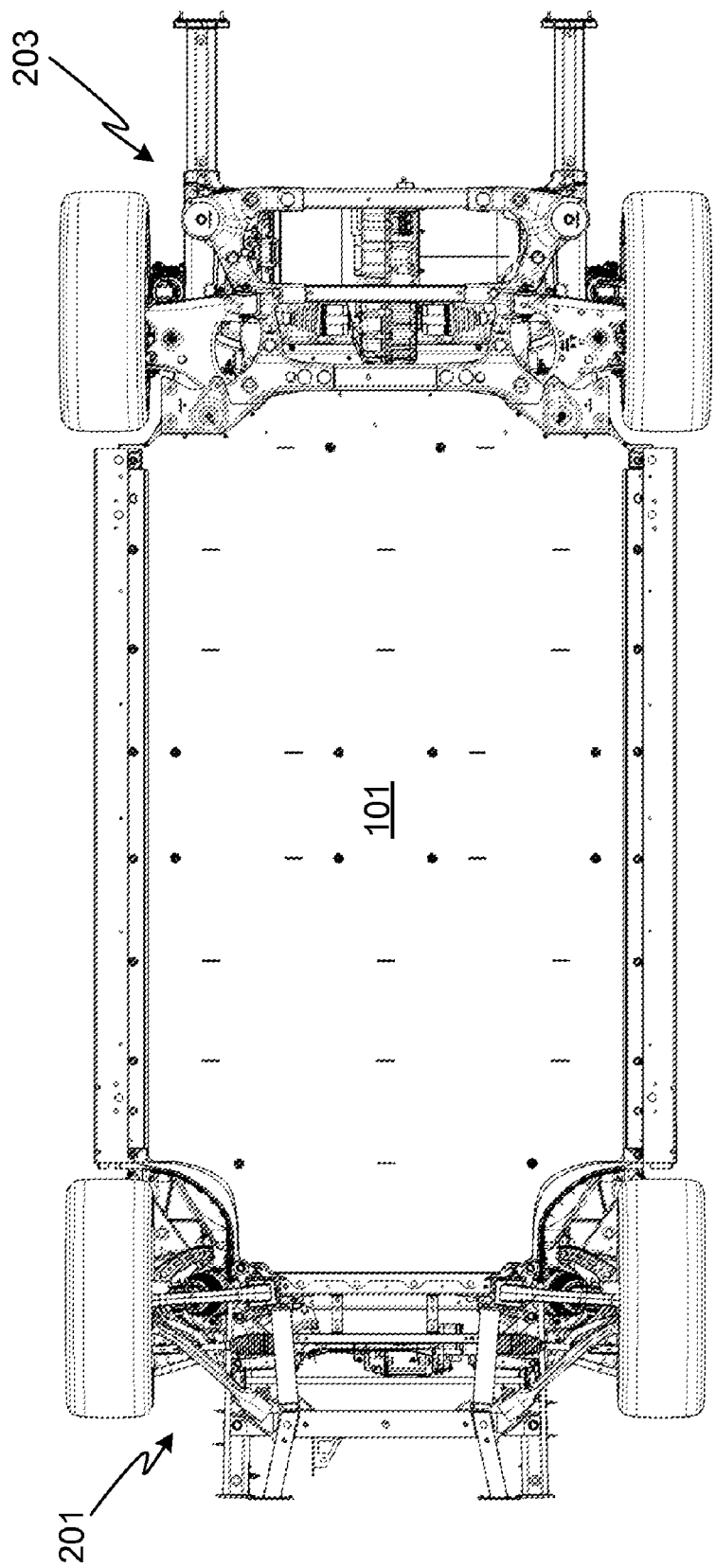
FIG. 3 provides a simplified bottom view of an electric vehicle with a battery pack incorporated into the vehicle structure.

In accordance with the present invention, and as illustrated in FIGS. 1-3, a battery pack 101 is mounted under the floor panel of an electric vehicle 100. Preferably the battery pack is integrated within the vehicle's structural frame, thus utilizing the battery pack's inherent rigidity and strength to enhance the overall performance and impact resistance of vehicle 100. In the illustrated embodiment, battery pack 101 not only transverses the width of the vehicle, i.e., from rocker panel to rocker panel, but also extends most of the distance between the front suspension 201 and the rear suspension 203. It will be appreciated that while smaller battery packs mounted under the vehicle's floor panel(s) may be used with the invention, such smaller packs will typically not provide the same level of vehicle performance enhancement as that provided by the preferred battery pack. In the illustrated embodiment, battery pack 101 is approximately 2.7 meters long and 1.5 meters wide and has a thickness that varies between approximately 0.1 meters to 0.18 meters, the thicker dimension applicable to those portions of the battery pack in which battery modules are stacked one on top of another.

Figure 4:
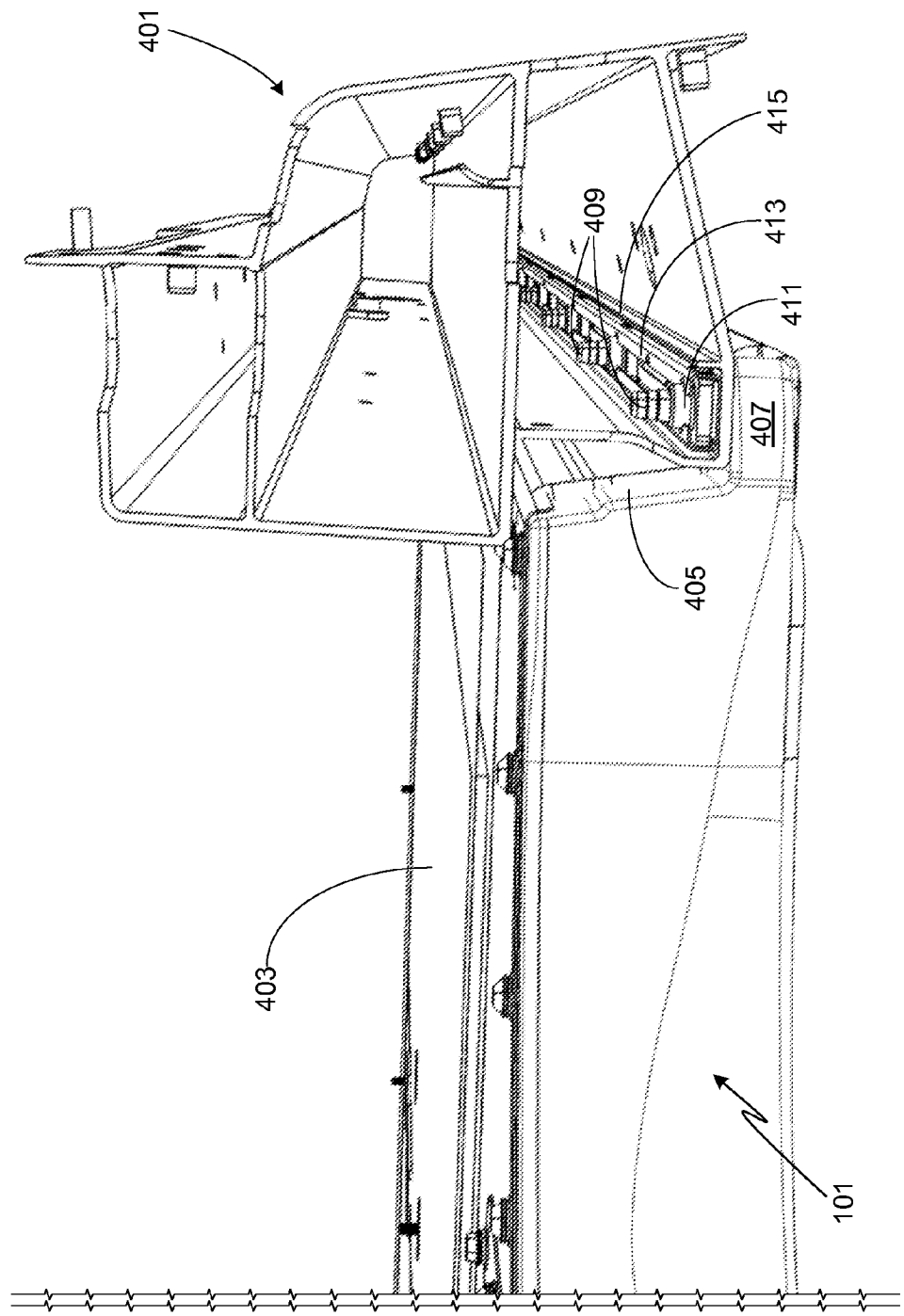
FIG. 4 provides a perspective view of a battery pack to rocker panel assembly.

As noted above, preferably battery pack 101 is configured to transverse the width of the vehicle and be coupled to the rocker panels located on either side of the vehicle. FIG. 4 illustrates the attachment of battery pack 101 to a rocker 401, this figure showing the location of battery pack 101 under vehicle floor panel 403. Preferably rocker 401 is extruded, for example using an aluminum or aluminum alloy extrusion as described in detail in co-pending U.S. patent application Ser. No. 13/308,206, filed 30 Nov. 2011, and attached to the battery as described in co-pending U.S. patent application Ser. No. 13/308,300, filed 30 Nov. 2011, the disclosures of which are incorporated herein for any and all purposes. In general and as illustrated for the preferred embodiment, battery pack enclosure 101 includes side members 405 that include an extended mounting flange, or region, 407 that is positioned under rocker 401. Region 407 is perforated in order to allow passage of a plurality of mounting bolts 409. Mounting bolts 409, in combination with nuts 411, mechanically couple extended region 407 of battery pack 101 to rocker 401. To simplify assembly, channel nuts 411 are held in place during vehicle assembly using a channel nut retainer 413. Retainer 413 is positioned within rocker 401 using internal feature 415, thereby simplifying vehicle assembly and reducing manufacturing costs. It will be understood that other techniques may be used to mount the battery pack under the vehicle's floor panel.

Figure 5:
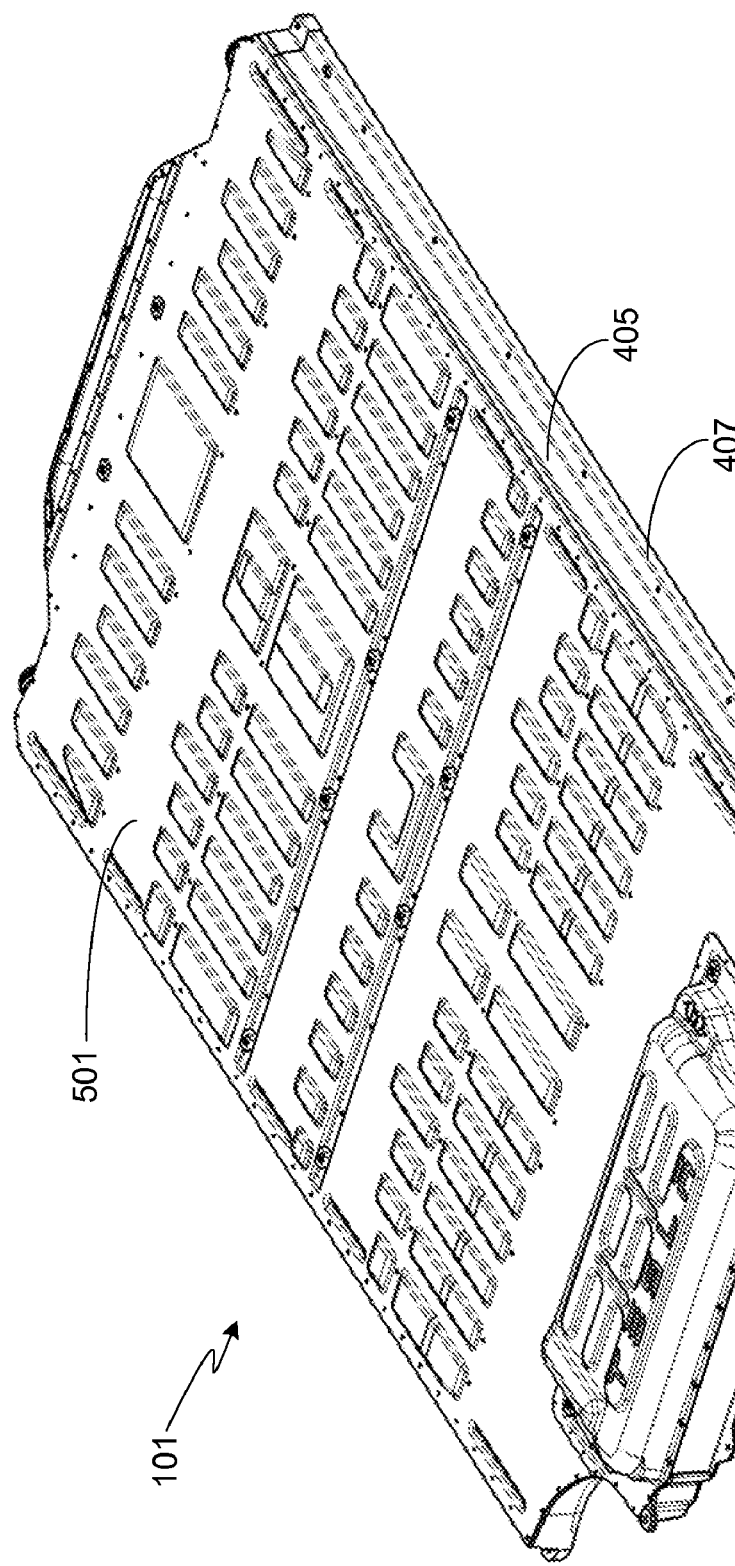
FIG. 5 provides a perspective view of the battery pack shown in FIGS. 1-4.
Figure 6:
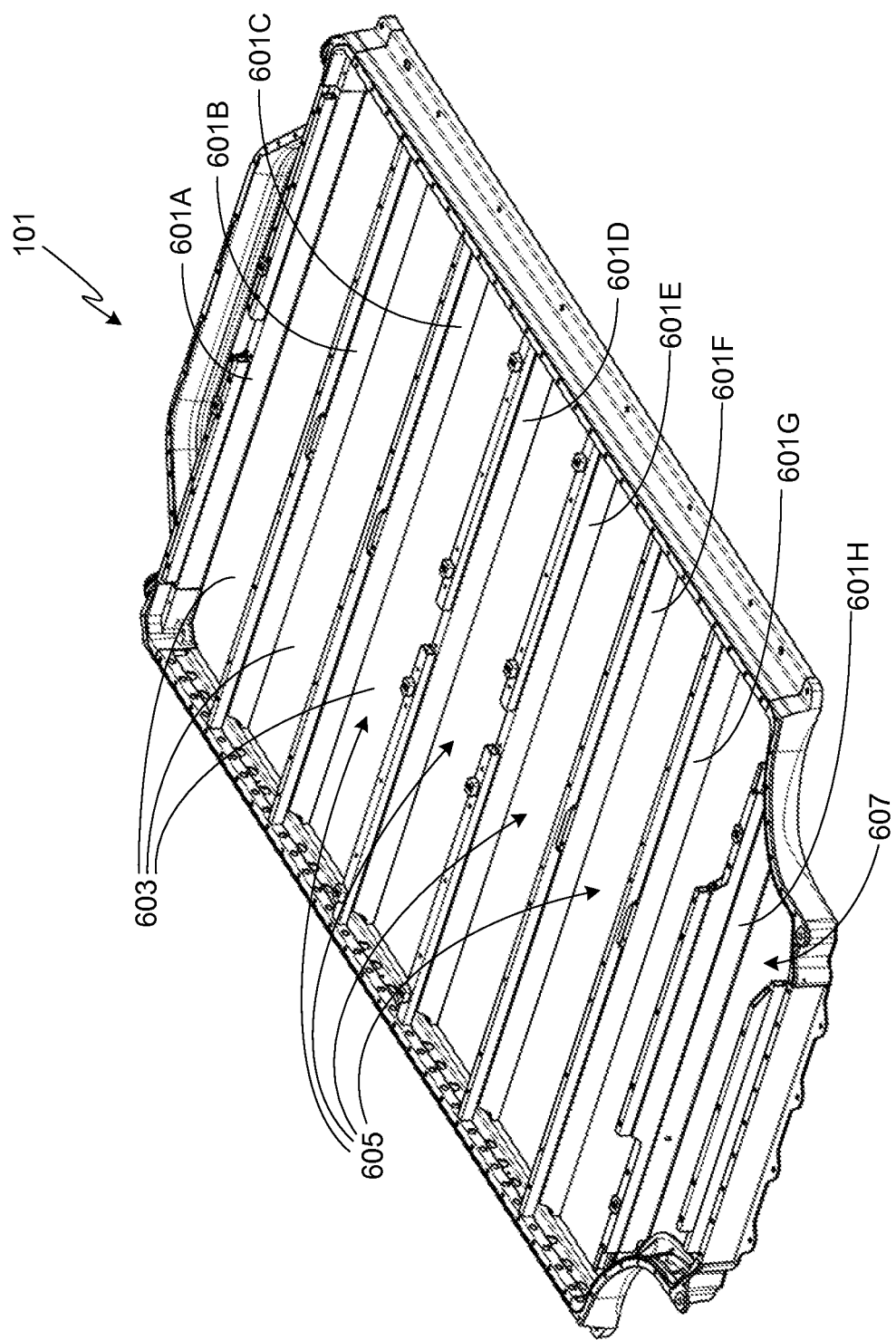
FIG. 6 provides a perspective view of the battery pack shown in FIGS. 1-5, with the top panel removed.

FIG. 5 provides a perspective view of battery pack 101 with the top enclosure panel 501 in place, panel 501 preferably providing a substantially airtight seal. Side structural elements 405, which are preferably hollow or include multiple cavities, are also visible as is battery pack mounting flange 407 that is used to mechanically and thermally couple the battery pack enclosure to the vehicle structure (not shown in this figure). FIG. 6 shows battery pack 101 with top member 501 removed, this view showing multiple cross-members 601A-601H. The number of cross-members is based on the number of cells/cell modules that are to be encased within the battery pack as well as the desired structural characteristics of the battery pack. Preferably battery pack side members 405, including extended regions 407, battery pack top panel 501, battery pack bottom panel 603 and cross-members 601A-601H are each fabricated from a light weight metal, such as aluminum or an aluminum alloy, although other materials such as steel may be used for some or all of the battery pack components. Bottom panel 603 may be welded, brazed, soldered, bonded or otherwise attached to side members 405, with the resultant joint between panel 603 and member 405 preferably being substantially air-tight as well as being strong enough to allow bottom panel 603 to support the batteries contained within the pack. Top panel 501 is typically attached to members 405 using bolts or similar means, thus simplifying battery replacement as well as allowing battery interconnects, battery pack components, cooling system components and other battery pack components to be repaired and/or replaced.

Cross-members 601A-601H provide several benefits. First and foremost, cross-members 601A-601H provide mechanical and structural strength and rigidity to the battery pack and to the vehicle to which the battery pack is attached. Additionally, cross-members 601A-601H help to segregate thermal events by providing a thermal barrier between groups of cells as well as minimizing gas flow between sections 605, sections 605 being defined by the cross-members, side members 405, top member 501 and bottom member 603. By segregating thermal events within smaller groups of cells, thermal runaway propagation is limited as is the potential for battery pack damage.

Figure 7:
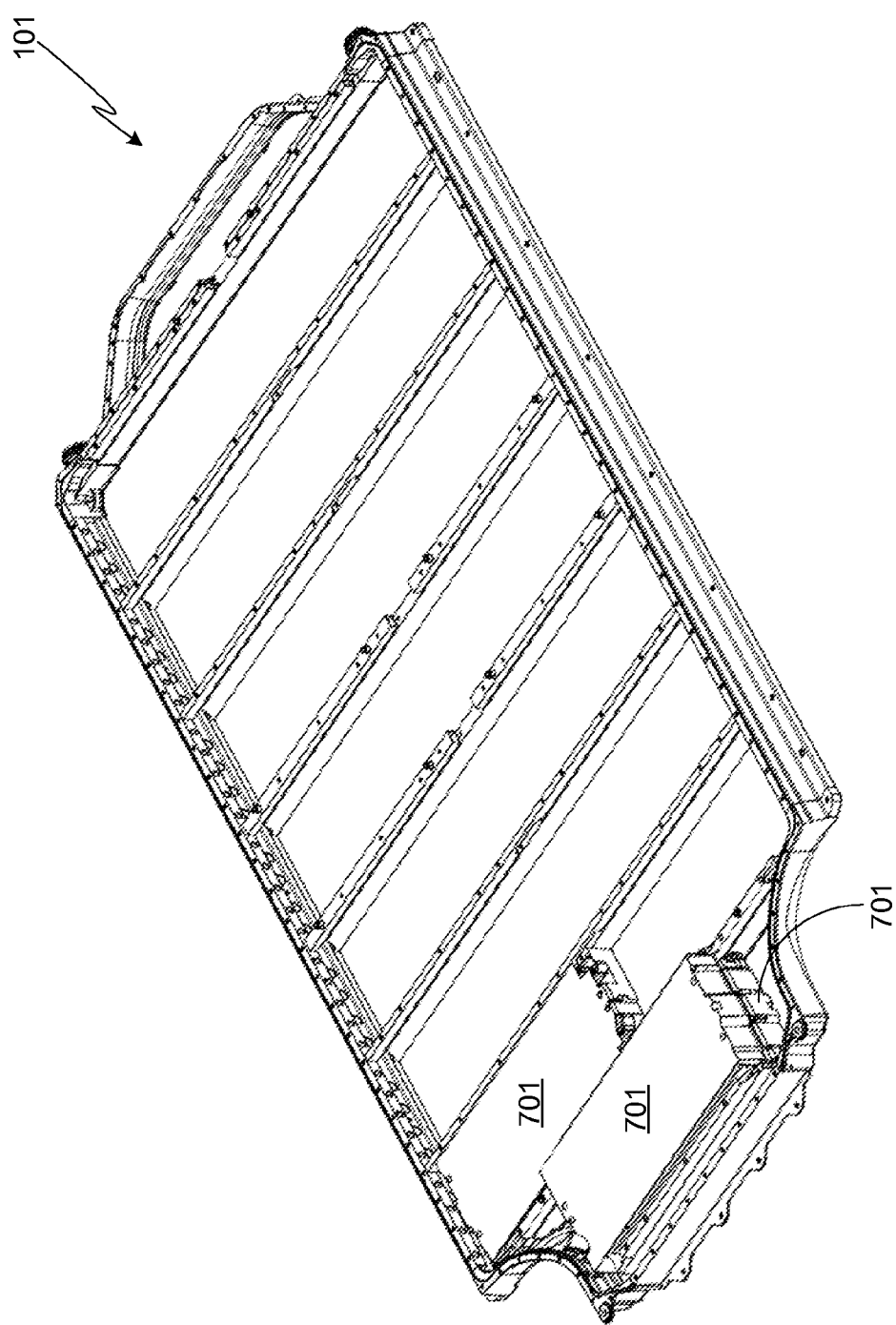
FIG. 7 provides a perspective view of the battery pack shown in FIGS. 1-6, this view showing three of the battery modules in place within the pack.

FIG. 7 shows a similar view to that provided by FIG. 6, with the inclusion of a couple of cell modules 701. In this illustration, a single module 701 is shown positioned within one of the seven, larger sections 605 of battery pack 101. Note that in the illustrated embodiment, each large section 605 is designed to house a pair of battery pack modules 701. Additionally, in this illustration there are two modules 701 stacked one on top of the other in the front section 607 of pack 101. Note that in the preferred embodiment, each module 701 contains 370 individual cells, each cell utilizing an 18650 form factor. It should be understood, however, that this configuration is only exemplary of a preferred embodiment and that the invention is equally applicable to other configurations, for example utilizing batteries with a different form factor, a larger or smaller number of cells, individual cells versus modules, different cell chemistries, etc.

Figure 8:
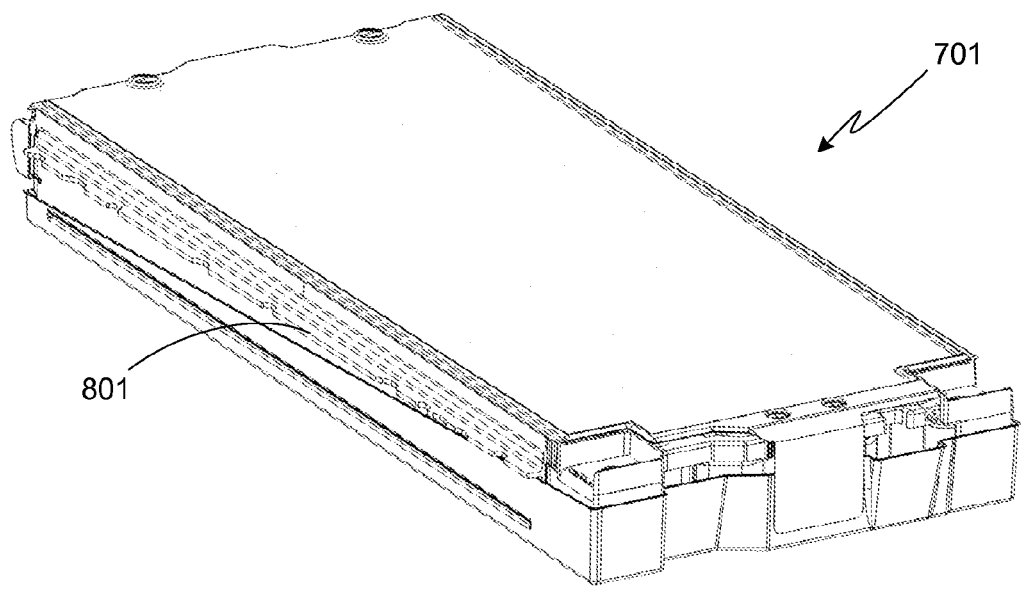
FIG. 8 provides a perspective views of a single battery module for use within the battery pack shown in FIGS. 1-7.
Figure 9:
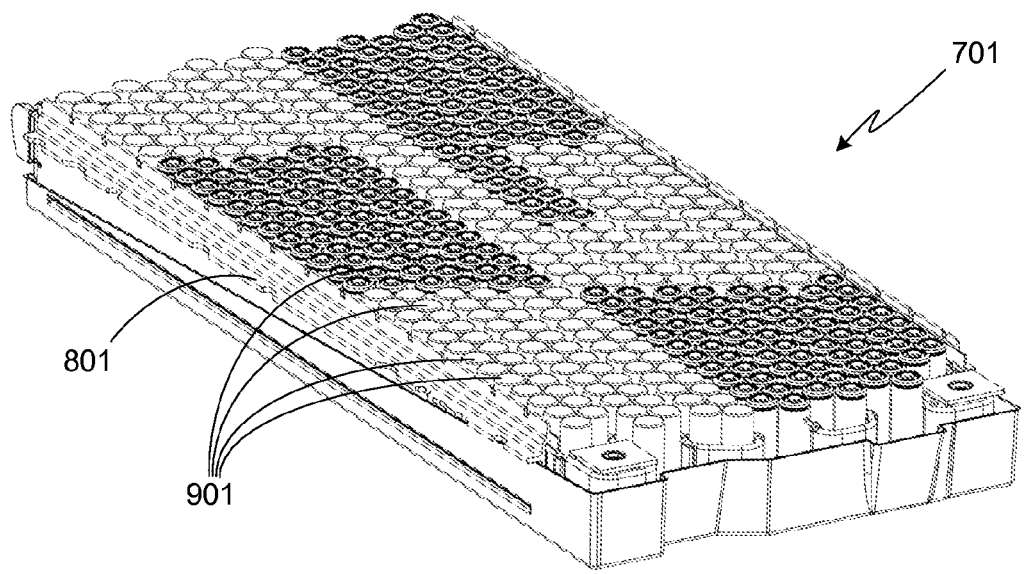
FIG. 9 illustrates the battery module shown in FIG. 8 with the upper module components removed.
Figure 10:
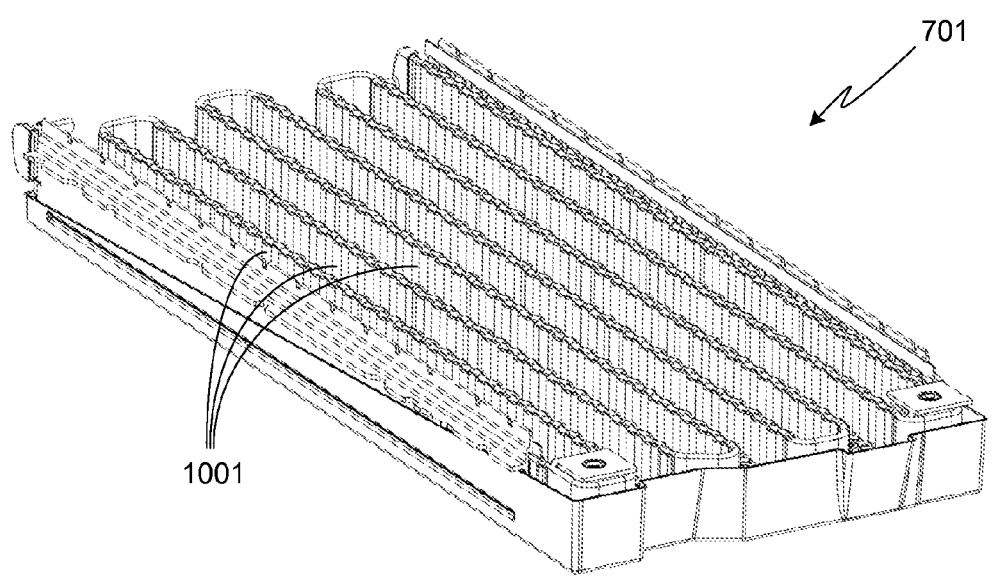
FIG. 10 illustrates the battery module shown in FIGS. 8 and 9 with the cells removed.

As noted above, the present invention does not rely on a particular implementation of the battery pack enclosure and more specifically, does not rely on a particular implement of the batteries and battery modules that are contained within the battery pack enclosure. Specific implementations of both are only provided herein to illustrate one preferred configuration. FIG. 8 provides a perspective view of a single module 701, this view highlighting the module mounting flange 801. In this configuration, mounting flanges 801 are located on either side of the module and, during battery pack assembly, are captured between upper and lower sections of each cross-member. FIG. 9 shows the previously illustrated battery module with the upper portion of module 701 removed as well as several of the upper module components (e.g., cell locator plate, current collector plate, etc.), thus making the individual cells 901 visible. Note that the orientation of cells 901 within module 701 varies. FIG. 10 provides a similar view to that of FIG. 9, with the exception that cells 901 have been removed. With the removal of cells 901, the cooling conduits 1001 are visible, conduits 1001 being coupled to the battery pack thermal management system (not shown).

Figure 11:
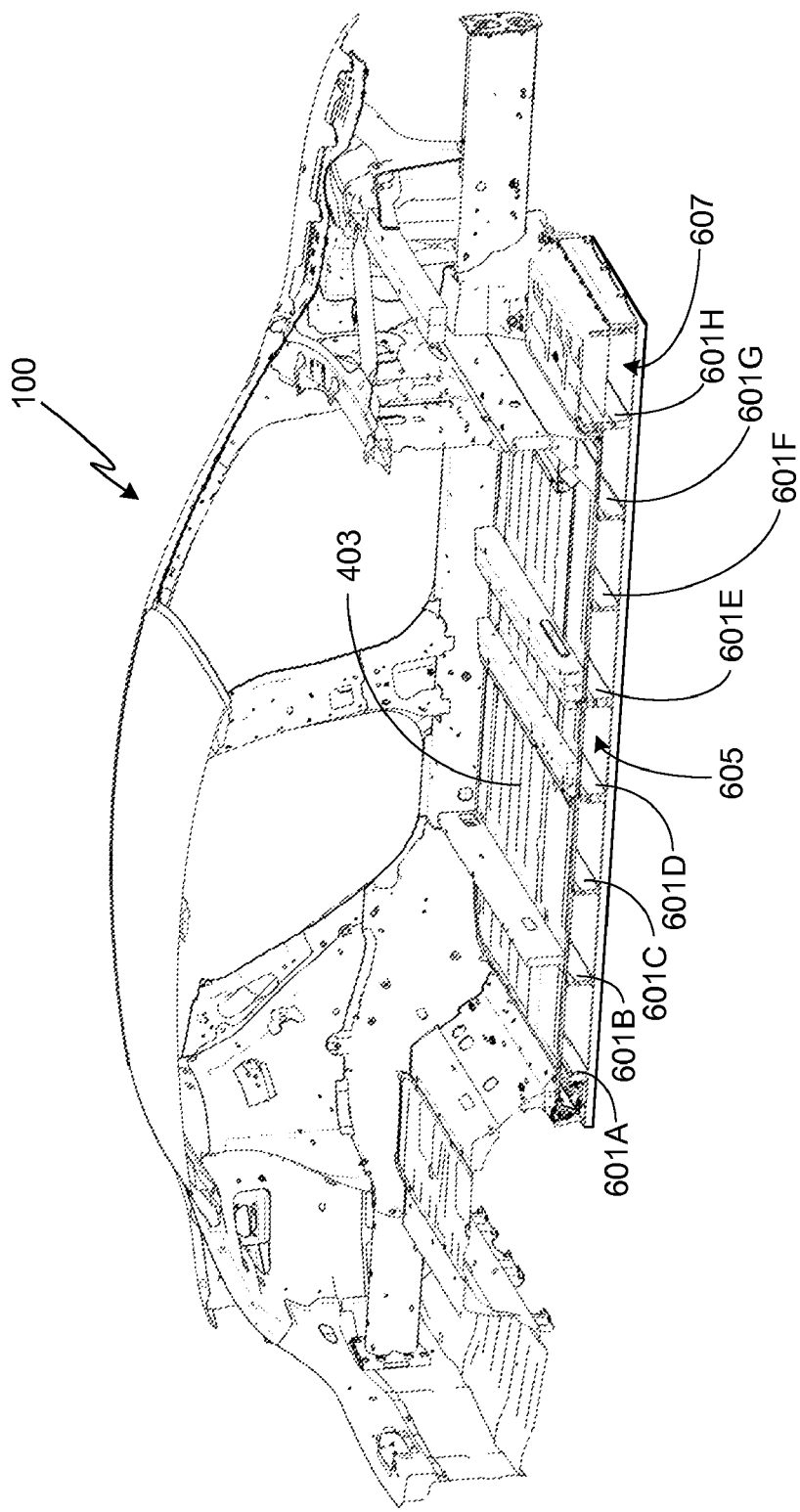
FIG. 11 provides a perspective, cross-sectional view of the battery pack shown in FIGS. 1-7 mounted under the floor panel of the vehicle shown in FIG. 1.

FIG. 11 provides a perspective, cross-sectional view of battery pack 101 mounted under floor panel 403 of vehicle 100. This view also provides additional views of the cross-members. Note that in this figure the batteries/battery modules are not shown within the battery pack, thus simplifying the figure in order to better illustrate the basic battery pack/vehicle assembly.

As shown in the cross-sectional view of FIG. 11, preferably cross-members 601A-601H do not utilize the same cross-section; rather the cross-section of each is optimized for that particular member's location within the pack. In general, cross-members 601A-601H may either be comprised of a single unit or as preferred, comprised of an upper section and a lower section, thus providing a convenient means of capturing and mounting the battery modules 701. One or both sections of each cross-member may be hollow, thus minimizing weight while still providing a rigid and strong structural member. It should be understood that not only can the configuration/design of the cross-members vary, depending upon their location within the pack, so can the materials comprising the cross-members. Therefore while cross-members 601A-601H are preferably fabricated from aluminum or an aluminum alloy, for example using an extrusion process, other materials (e.g., steel, ceramics, etc.) may also be used if such materials fit both the mechanical and thermal goals for the particular cross-member in question. Additionally, the lumens within one or more of the cross-members may be unfilled or filled, for example filled with a high melting temperature, low thermal conductivity material (e.g., fiberglass or similar material). Alternately, the lumens within the cross-members may include a liquid (e.g., water), the liquid being either stagnant or flowing. If stagnant, the liquid may be contained within the lumens themselves or, as preferred, contained within pouches that fit within the cavities. If the liquid is flowing, it is preferably contained within tubing that is inserted within the cross-member cavities and either coupled to a battery cooling system or used in a stand-alone circulation system.

Preferably and as illustrated in FIG. 11, cross-members 601D and 601E are larger than the other central cross-members. The reason for the increased size for these particular cross-members is to provide additional cross-member strength at those locations that are most critical to resisting side impact loads that may be encountered during a collision.

Figure 12:
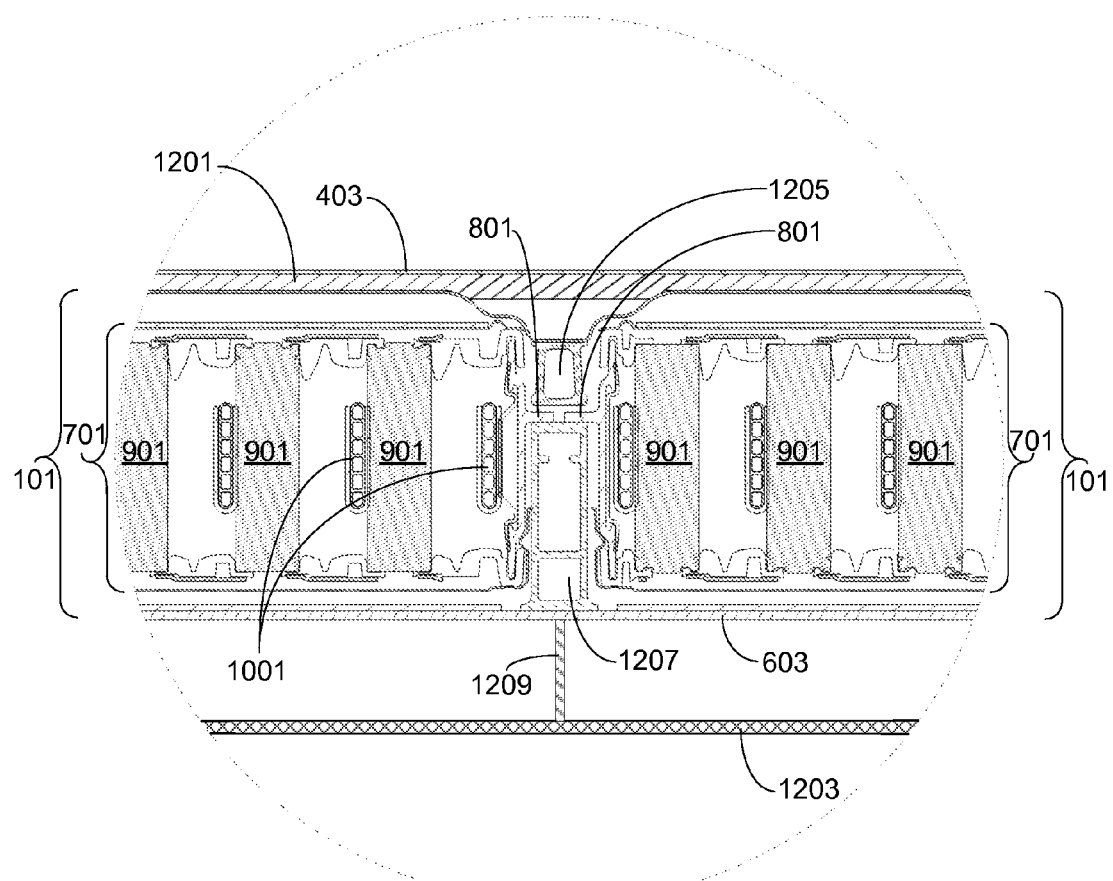
FIG. 12 provides a detailed cross-sectional view of a portion of the battery pack along with the structures immediately above and below the battery pack enclosure.

FIG. 12 provides a detailed cross-sectional view of a portion of battery pack 101 along with the structures immediately above and below the battery pack enclosure. Note that due to the plane used for purposes of this cross-section, and due to the staggering of batteries in this embodiment as illustrated in FIG. 9, the cells mounted to the left side of each cooling conduit 1001 are not visible in this figure.

FIG. 12 shows two of the primary aspects of the invention; an upper insulating layer 1201 interposed between the upper surface of battery pack 101 and the vehicle floor panel 403, and a lower ballistic shield 1203 located between the lower surface of battery pack 101 and the road surface. Each of these components is discussed separately below as they may be used alone, or together, for an under floor mounted battery pack. Note that in the configuration shown in FIGS. 12-15, module mounting flanges 801 are shown captured between a cross-member upper section 1205 and a cross-member lower section 1207, the upper and lower sections providing a simple means of locating and holding the module in place within the battery pack.

Battery Pack Upper Insulating Layer

Figure 13:
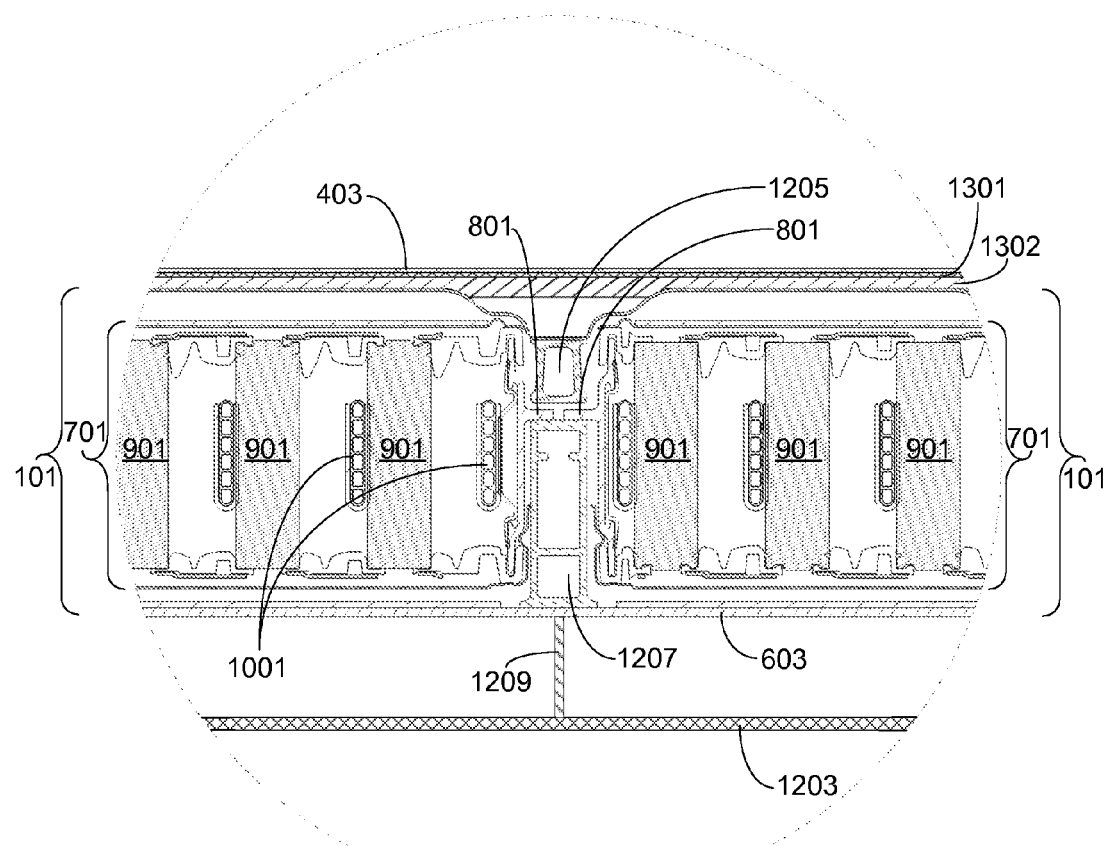
FIG. 13 illustrates a modification of the embodiment shown in FIG. 12 in which two different layers are interposed between the top of the battery pack enclosure and the underside of the vehicle floor panel.
Figure 14:
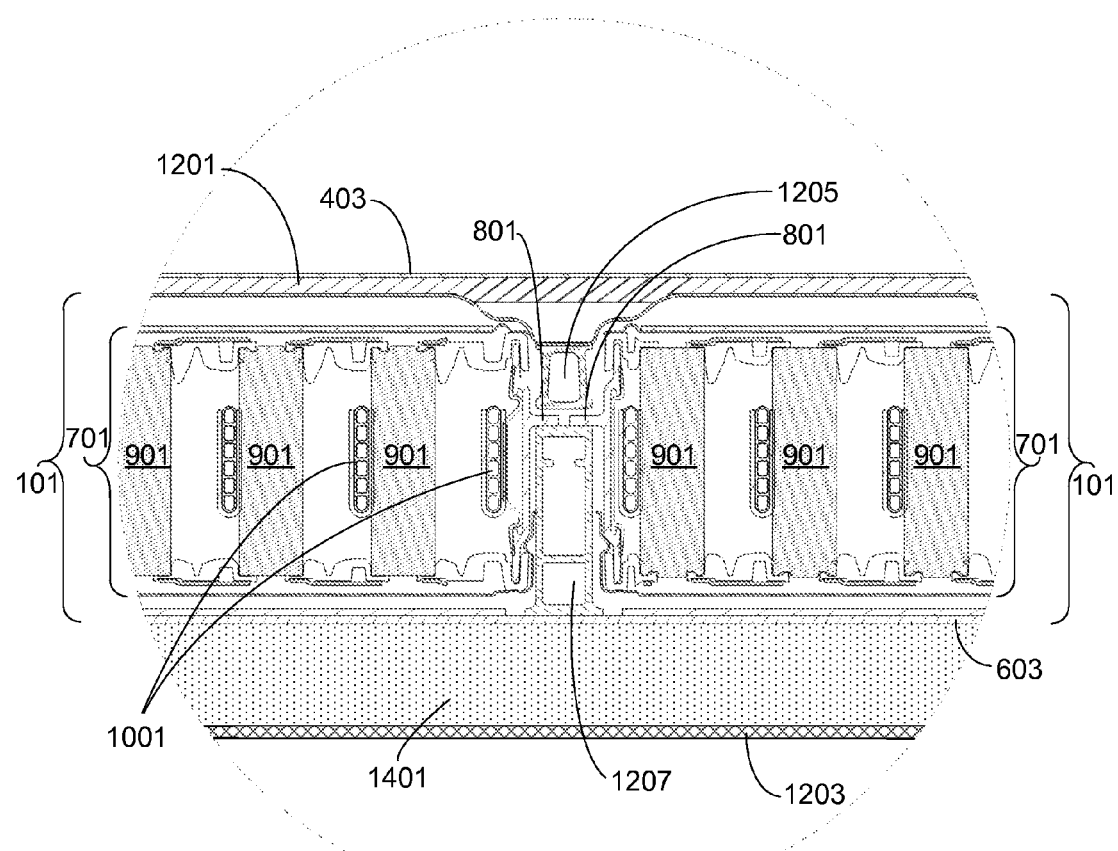
FIG. 14 illustrates a modification of the embodiment shown in FIG. 12 in which a compressible material is interposed between the battery pack and the ballistic shield.
Figure 15:
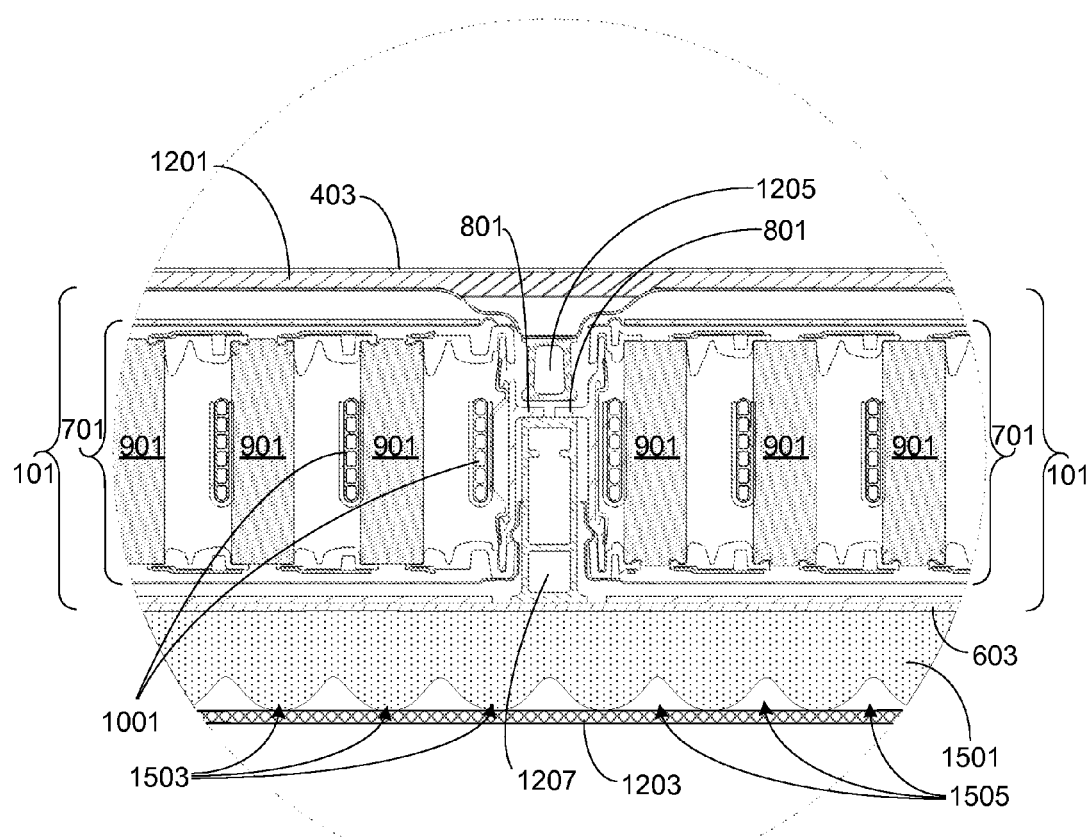
FIG. 15 illustrates a modification of the embodiment shown in FIG. 12 in which a shaped compressible material is interposed between the battery pack and the ballistic shield.

As described in detail below, preferably layer 1201 is a multi-purpose layer that dramatically enhances passenger comfort by providing noise isolation and damping vibrations that might otherwise pass into the passenger cabin. Preferably layer 1201 also acts as a thermal barrier between battery pack 101 and floor panel 403, and therefore between battery pack 101 and the passenger compartment. It should be understood that while a single layer is shown in FIGS. 12, 14 and 15, layer 1201 may actually be comprised of multiple layers as illustrated in FIG. 13, thus allowing each layer to be targeted and optimized for a specific purpose.

While the bulk of the battery pack enclosure, including the various components within the battery pack, help to isolate the passenger compartment from road noise and other external noises, it will be appreciated that many noises pass through, or are transmitted by, battery pack 101. Accordingly, in the preferred embodiment layer 1201 is used to prevent noise intrusion into and through vehicle flooring 403. Preferably layer 1201 provides an acoustic insertion loss of greater than 10 dB, and more preferably greater than 20 dB, for frequencies above 1000 Hz in general, and for frequencies between 1000 Hz and 10 kHz in particular.

In addition to providing sound isolation, preferably layer 1201 also provides vibration damping. Preferably layer 1201 has a damping loss factor of at least 0.1 (10%), more preferably at least 0.25 (25%), still more preferably at least 0.3 (30%), and yet still more preferably at least 0.4 (40%).

Layer(s) 1201 also provides thermal isolation, specifically isolating the passenger cabin from heat generated by the batteries within battery pack 101 and helping to insure that the batteries are allowed to operate within the preferred temperature range regardless of the temperature within the passenger cabin. Preferably layer 1201 is designed to isolate the passenger cabin during normal vehicle operation, thus insuring passenger comfort, and in the event of the occurrence of thermal runaway within the pack, thus insuring passenger safety. In a preferred embodiment, layer 1201 exhibits low thermal conductivity while being resistant to high temperatures. For example, in one embodiment layer 1201 has a thermal conductivity of less than 0.25 W/m-K, preferably less than 0.2 W/m-K, more preferably less than 0.15 W/m-K, and still more preferably less than 0.1 W/m-K. In one embodiment layer 1201 is capable of withstanding temperatures of more than 500° C. continuously, preferably capable of withstanding temperatures of more than 750° C. continuously and/or withstanding temperatures of more than 1000° C. for a period of at least 10 seconds, more preferably capable of withstanding temperatures of more than 900° C. continuously and/or withstanding temperatures of more than 1000° C. for a period of at least 10 seconds, and still more preferably capable of withstanding temperatures of more than 1000° C. continuously and/or withstanding temperatures of more than 1400° C. for a period of at least 1 second.

In order to meet the goals stated above, especially insertion and damping loss, the inventors have found that layer or layers 1201 must be compressed, preferably on the order of 30%. Additionally, by compressing layer 1201, a strong mechanical coupling between floor panel 403 and the rigid battery pack structure is achieved, allowing the rigidity of the battery pack enclosure to augment the stiffness of the floor panel, thereby providing a stiffer flooring for the passenger cabin than would otherwise be achieved for the same thickness floor panel.

In one embodiment, layer 1201 is comprised of a 6 millimeter blanket which is compressed down to approximately 4 millimeters when the battery pack 101 is mounted to the vehicle's underbody. For this amount of compression, the compression modulus of the material is preferably low enough to allow layer 1201 to "flow" into all of the features of the vehicle's floor panel 403 and top panel 501 of the battery pack. In addition, a relatively soft material is needed to allow for assembly since even a low modulus material can exert a large force during compression given the very large surface area of battery pack 101. In at least one embodiment, a compression modulus of 1.5 PSI at 25% compression is preferred, this value typically referred to as the material's CLD (i.e., compression load deflection).

In one preferred embodiment, layer 1201 is comprised of a compressible ceramic fiber sheet, for example one fabricated from a weave of silica and calcium oxide fibers held together with a binder (e.g., an organic binder). Alternate exemplary materials suitable to fabricate layer 1201 include silica/silica fibers, alumina, Kevlar®, Nomex® and calcium-magnesium-silicate fibers.

In an alternate preferred embodiment, layer 1201 is comprised of two layers 1301/1302 as illustrated in FIG. 13. Layer 1301, preferably located adjacent to the underside of floor panel 403, is comprised of a low modulus, highly conformable foam. Layer 1302, preferably located adjacent to the top panel of battery pack 101, is comprised of a ceramic fiber sheet. In an exemplary embodiment, layer 1301 is approximately 3 millimeters thick and comprised of a closed cell foam urethane sheet and layer 1302 is approximately 6 millimeters thick and comprised of silica and calcium oxide fibers held together with a binder.

Battery Pack Lower Ballistic Shield

Although battery pack enclosure 101 is designed to protect the batteries contained therein, due to the location of battery pack 101 under the floor panel of the vehicle it is possible for road debris to impact the lower surface 603 of the battery pack with sufficient force to dent and deform it and potentially damage cells 901 or the cell interconnects, cooling conduits, etc. Accordingly, in at least one embodiment an additional ballistic shield 1203 is mounted below and at some distance from pack 101, thereby providing another level of protection. It should be understood that the inclusion of a lower ballistic shield is independent of the inclusion of one or more layers between the battery pack and the floor panel (e.g., layer 1201, layers 1301/1302) and therefore a vehicle may use one, or both, innovations.

In order to prevent road debris that impacts shield layer 1203 from transferring that impact force directly into the lower surface 603 of the battery pack 101, layer 1203 is spaced apart from pack 101. As a result, when an object impacts layer 1203, the battery pack enclosure remains undamaged even if layer 1203 is deformed. Typically ballistic shield 1203 is spaced at least 10 millimeters from lower battery pack surface 603, preferably at least 15 millimeters from lower battery pack surface 603, more preferably at least 25 millimeters from lower battery pack surface 603, still more preferably at least 35 millimeters from lower battery pack surface 603, and yet still more preferably at least 50 millimeters from lower battery pack surface 603.

Shield layer 1203 is formed of a relatively light-weight material, such as a light-weight metal (e.g., aluminum, aluminum alloy, etc.) or a composite such as a carbon fiber/epoxy composite. Alternately, layer 1203 may be comprised of fiberglass or a plastic (e.g., polyethylene, polypropylene, polystyrene, polyvinyl chloride, polytetrafluoroethylene, etc.).

Ballistic shield layer 1203 may be mounted directly to the underside of vehicle 101 or, via stand-offs, to the underside of battery pack 101. Regardless of whether the perimeter of shield 1203 is mounted to the vehicle undercarriage or to the battery pack, preferably a plurality of stand-offs are used to hold layer 1203 apart from the underside of battery pack 101. The stand-offs, represented by stand-off 1205 in the figures, adds rigidity to shield 1203 while still allowing it to be relatively thin. Preferably the stand-offs are located adjacent to a cross-member, as shown, thus helping to prevent an impact at the location of the stand-off from deforming the battery pack and the components contained therein.

In a modification of the shield configuration described above, a layer 1401 of a compressible material is interposed between the bottom 603 of pack 101 and shield 1203. Although layer 1401 may be used in conjunction with stand-offs 1205, preferably layer 1401 acts as a replacement for the stand-offs as illustrated in FIG. 14. In addition to damping vibrations during normal vehicle operation, layer 1401 also damps and distributes impact energy when an object impacts shield 1203, thereby providing another level of protection for battery pack 101. Preferably layer 1401 is fabricated from a compressible material that is easily deformed. The deformation of the compressible material may be elastic or inelastic. In one embodiment layer 1401 is fabricated from a plastic, for example using injection molding. In an alternate embodiment layer 1401 is fabricated from foam (e.g., a closed cell urethane foam).

FIG. 15 illustrates a modification of the embodiment shown in FIG. 14. As shown, the layer 1501 that is interposed between pack 101 and shield 1203 is shaped to include a plurality of projections (e.g., fingers or bumps) 1503 that contact both surface 603 and shield 1203, and a plurality of dips 1505 that only contact one of the two surface (e.g., either bottom pack layer 603 as shown or ballistic shield layer 1203). An exemplary design for layer 1501 utilizes the shape commonly referred to as "egg crate shaped".

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

The invention claimed is:

1. A vehicle battery pack protection system, comprising:
a battery pack enclosure mounted under an electric vehicle, wherein said battery pack enclosure comprises an enclosure top panel, an enclosure bottom panel, and a plurality of enclosure side members, wherein said battery pack enclosure is configured to hold a plurality of batteries, and wherein said battery pack enclosure is mounted between a passenger cabin floor panel and a driving surface;
a ballistic shield mounted under said electric vehicle and below said battery pack enclosure, wherein said ballistic shield is interposed between said battery pack enclosure and said driving surface, and wherein said ballistic shield is spaced apart from said enclosure bottom panel by at least 5 millimeters; and
a layer of compressible material interposed between said ballistic shield and said battery pack enclosure.

2. The vehicle battery pack protection system of claim 1, wherein said compressible material deforms upon compression in an inelastic manner.

3. The vehicle battery pack protection system of claim 1, wherein said compressible material deforms upon compression in an elastic manner.

4. The vehicle battery pack protection system of claim 1, wherein said compressible material is comprised of a material selected from the group of materials consisting of foam and plastic.

5. The vehicle battery pack protection system of claim 1, wherein said compressible material is shaped to include a plurality of projections and a plurality of dips, wherein said plurality of projections extend from said enclosure bottom panel to said ballistic shield and contact both said enclosure bottom panel and said ballistic shield, and wherein said plurality of dips do not extend completely from said enclosure bottom panel to said ballistic shield and contact only said enclosure bottom panel.

6. The vehicle battery pack protection system of claim 1, wherein said compressible material is shaped to include a plurality of projections and a plurality of dips, wherein said plurality of projections extend from said enclosure bottom panel to said ballistic shield and contact both said enclosure bottom panel and said ballistic shield, and wherein said plurality of dips do not extend completely from said enclosure bottom panel to said ballistic shield and contact only said ballistic shield.

7. The vehicle battery pack protection system of claim 1, wherein said battery pack enclosure is substantially airtight.

8. The vehicle battery pack protection system of claim 1, wherein said enclosure top panel, said enclosure bottom panel, and said plurality of enclosure side members are each fabricated from a material selected from the group of materials consisting of aluminum, aluminum alloys and steel.

9. The vehicle battery pack protection system of claim 1, wherein said enclosure bottom panel is welded, brazed, soldered or bonded to said plurality of enclosure side members, and wherein said enclosure top panel is bolted to said plurality of enclosure side members.

10. The vehicle battery pack protection system of claim 1, wherein said battery pack enclosure is mounted between a first vehicle structural side member located adjacent to a first side of said vehicle and a second vehicle structural side member located adjacent to a second side of said vehicle, wherein said battery pack enclosure is mounted between a front vehicle suspension assembly and a rear vehicle suspension assembly, wherein said battery pack enclosure transverses the distance between said first vehicle structural side member and said second vehicle structural side member, wherein a first side member of said plurality of enclosure side members is mechanically coupled to said first vehicle structural side member and a second side member of said plurality of enclosure side members is mechanically coupled to said second vehicle structural side member, wherein said battery pack enclosure further comprises a plurality of cross-members integrated into said battery pack enclosure, wherein each of said plurality of cross-members transverses the distance between said first and second side members of said battery pack enclosure, and wherein said plurality of cross-members segregate said plurality of batteries into groups of batteries.

11. The vehicle battery pack protection system of claim 10, wherein said first vehicle structural side member is a left side rocker panel, and wherein said second vehicle structural side member is a right side rocker panel.

12. The vehicle battery pack protection system of claim 10, further comprising a plurality of stand-offs, wherein said plurality of stand-offs are interposed between said ballistic shield and said enclosure bottom panel, and wherein said plurality of stand-offs are coupled to an outer surface of said enclosure bottom panel adjacent to mounting locations of said plurality of cross-members mounted to an inner surface of said enclosure bottom panel.

13. The vehicle battery pack protection system of claim 1, wherein said ballistic shield is spaced apart from said enclosure bottom panel by at least 10 millimeters.

14. The vehicle battery pack protection system of claim 1, wherein said ballistic shield is spaced apart from said enclosure bottom panel by at least 15 millimeters.

15. The vehicle battery pack protection system of claim 1, wherein said ballistic shield is spaced apart from said enclosure bottom panel by at least 25 millimeters.

16. The vehicle battery pack protection system of claim 1, wherein said ballistic shield is spaced apart from said enclosure bottom panel by at least 35 millimeters.

17. The vehicle battery pack protection system of claim 1, wherein said ballistic shield is spaced apart from said enclosure bottom panel by at least 50 millimeters.

18. The vehicle battery pack protection system of claim 1, wherein said ballistic shield is comprised of a material selected from the group of materials consisting of aluminum, aluminum alloys, steel, fiberglass, carbon fiber/epoxy composites, and plastic.

19. The vehicle battery pack protection system of claim 1, further comprising a plurality of stand-offs, wherein said plurality of stand-offs are interposed between said ballistic shield and said enclosure bottom panel.

* * * * *